United States Patent
Muenz

(10) Patent No.: US 9,042,032 B2
(45) Date of Patent: May 26, 2015

(54) OPTICAL ARRANGEMENT FOR CONVERTING AN INCIDENT LIGHT BEAM, METHOD FOR CONVERTING A LIGHT BEAM TO A LINE FOCUS, AND OPTICAL DEVICE THEREFOR

(71) Applicant: Carl Zeiss Laser Optics GmbH, Oberkochen (DE)

(72) Inventor: Holger Muenz, Aalen (DE)

(73) Assignee: Carl Zeiss Laser Optics GmbH, Oberkochen (DE)

( * ) Notice: Subject to any disclaimer, the term of this patent is extended or adjusted under 35 U.S.C. 154(b) by 0 days.

(21) Appl. No.: 14/074,207

(22) Filed: Nov. 7, 2013

(65) Prior Publication Data

US 2014/0118843 A1    May 1, 2014

Related U.S. Application Data

(63) Continuation of application No. PCT/EP2012/059439, filed on May 22, 2012.

(60) Provisional application No. 61/545,762, filed on Oct. 11, 2011.

(30) Foreign Application Priority Data

May 25, 2011    (DE) .......................... 10 2011 102 588

(51) Int. Cl.
G02B 27/09    (2006.01)
G02B 5/00    (2006.01)

(52) U.S. Cl.
CPC .............. *G02B 27/095* (2013.01); *G02B 5/001* (2013.01); *G02B 27/0911* (2013.01); *G02B 27/0927* (2013.01); *G02B 27/0972* (2013.01); *G02B 27/0977* (2013.01)

(58) Field of Classification Search
CPC .... G02B 5/001; G02B 13/18; G02B 6/02366; G02B 6/03611; G02B 27/095
USPC .................................................. 359/709, 708
See application file for complete search history.

(56) References Cited

U.S. PATENT DOCUMENTS 3,972,599 A    8/1976    Engel et al.
4,603,949 A *  8/1986    Clegg ............................ 359/709

(Continued)

FOREIGN PATENT DOCUMENTS

DE              33 42 531        6/1985
DE       10 2004 011 190 A1      9/2005

(Continued)

OTHER PUBLICATIONS

International Search Report and Written Opinion for corresponding PCT Appl No. PCT/EP2012/059439, mailed Nov. 7, 2012.
(Continued)

*Primary Examiner* — Scott J Sugarman
*Assistant Examiner* — William R Alexander
(74) *Attorney, Agent, or Firm* — Fish & Richardson P.C.

(57) ABSTRACT

In a method for converting a light beam to a line focus, wherein the line focus extends according to its length along a first direction (y) and is narrow in a second direction (x) perpendicular to the first direction (y), the light beam is directed onto at least one conical optically operative surface, by which it is converted to the line focus. The light beam is directed onto the at least one optically operative surface with a ring-segment-shaped cross section transversely with respect to the light propagation direction. A device, in particular for carrying out the method, and an optical arrangement for generating a light beam with a ring-segment-shaped cross section are likewise described. In accordance with a further method and a further device, a line focus is generated only with spherical and/or cylindrical elements.

20 Claims, 8 Drawing Sheets

(56) References Cited

U.S. PATENT DOCUMENTS

| | | | |
|---|---|---|---|
| 5,322,998 A * | 6/1994 | Jackson | 250/216 |
| 5,438,366 A * | 8/1995 | Jackson et al. | 348/342 |
| 5,963,359 A * | 10/1999 | Shinozaki et al. | 359/326 |
| 7,042,655 B2 * | 5/2006 | Sun et al. | 359/708 |
| 7,688,522 B2 * | 3/2010 | Nishioka | 359/708 |
| 2002/0111546 A1 * | 8/2002 | Cook et al. | 600/322 |
| 2009/0040906 A1 * | 2/2009 | Hong et al. | 369/112.23 |

FOREIGN PATENT DOCUMENTS

| | | |
|---|---|---|
| DE | 10 2007 018 400 A1 | 10/2008 |
| DE | 10 2008 041 991 A1 | 4/2009 |
| EP | 0 127 045 A2 | 12/1984 |
| EP | 0 143 446 | 6/1985 |
| JP | 6262384 | 9/1997 |
| WO | WO 2005/003746 | 1/2005 |

OTHER PUBLICATIONS

Chebbi et al., "Remote control of extended depth of field focusing", Optical Communications, Amsterdam, vol. 283, No. 9, May 1, 2010, pp. 1678-4018, XP026929372.

H. Gross, Handbook of Optical Systems, Verlag WILEY-VCH, vol. 1, Jan. 1, 2005, Chapter 15.9, pp. 751-756, XP009161294.

M. Rioux et al., "Linear, annular, and radial focusing with axicons and applications to laser machining", Applied Optics, Optical Society of America, Washington D.C., vol. 17, No. 10, May 1, 1978, pp. 1532-1536, XP001620826.

* cited by examiner

OPTICAL ARRANGEMENT FOR CONVERTING AN INCIDENT LIGHT BEAM, METHOD FOR CONVERTING A LIGHT BEAM TO A LINE FOCUS, AND OPTICAL DEVICE THEREFOR

CROSS-REFERENCE TO RELATED APPLICATIONS

The present application is a continuation of, and claims benefit under 35 USC 120 to, international application PCT/EP2012/059439, filed May 22, 2012, which claims benefit under 35 USC 119 of German Application No. 10 2011 102 588.3, filed May 25, 2011. International application PCT/EP2012/059439 also claims priority under 35 USC 119(e) to U.S. Provisional Application No. 61/545,762, filed Oct. 11, 2011. The entire disclosure of international application PCT/EP2012/059439 is incorporated by reference herein.

The invention relates, in accordance with a first aspect, to a method for converting a light beam to a line focus, wherein the line focus extends according to its length along a first direction and is narrow in a second direction perpendicular to the first direction, wherein the light beam is directed onto at least one conical, optically operative surface, by which it is converted to the line focus.

The invention relates, in accordance with a second aspect, to an optical device for converting a light beam to a line focus, in particular for carrying out the method mentioned above.

The invention relates, in accordance with a third aspect, to a method for converting a light beam to a line focus, wherein the line focus extends according to its length along a first direction and is narrow in a second direction perpendicular to the first direction, wherein the light beam is directed onto an optical arrangement, which defines an optical axis.

The invention relates, in accordance with a fourth aspect, to an optical device for converting a light beam to a line focus, wherein the line focus extends according to its length along a first direction and is narrow in a second direction perpendicular to the first direction, in particular for carrying out the method in accordance with the third aspect.

The invention relates, in accordance with a fifth aspect, to an optical arrangement for converting an incident light beam having a first non-ring-segment-shaped cross section transversely with respect to the light propagation direction into an emergent light beam having a ring-segment-shaped cross section, comprising a first conical optically operative surface and at least one second conical optically operative surface, wherein the incident light beam is incident successively on the first optically operative surface and on the second optically operative surface, wherein the first and second optically operative surfaces define an axis of symmetry.

Methods, optical devices and an optical arrangement of the type respectively mentioned in the introduction are known from the technical book: H. Gross, Handbook of Optical Systems, Verlag WILEY-VCH, 2005, Vol. 1, Chapter 15.9 (pages 751-756).

A method for converting a light beam to a line focus and a corresponding optical device are applied or used e.g. in the laser machining of workpieces, in particular for melting layers composed of amorphous silicon for the production of displays, or e.g. for the inspection of semiconductor slabs, in particular wafers for the semiconductor industry.

The technical book cited above describes how a light beam can be converted to a line focus via a conical optically operative surface. Optical components having a conical surface are also referred to as axicons, as is indicated in the technical book.

The technical book describes that a line focus can be generated via an axicon if the axicon, which is embodied there as a refractive component, is illuminated symmetrically with respect to the axis of symmetry, that is to say the cone axis of the conical optically operative surface. Downstream of the axicon, a line focus then arises having a length dependent on the cross-sectional size of the incident light beam, the refractive index of the material of the axicon and the cone angle of the axicon. However, the intensity distribution of the light in the line focus thus generated is not homogeneous as seen over the length of the line focus, as is described therein. However, an intensity distribution that is not homogeneous over the length of the line focus is not desirable in many applications, in particular in the areal laser machining of workpieces.

The document WO 2005/003746 A1 describes an optical device for generating a line focus, which device is used in a system for the inspection of semiconductor slabs, in particular wafers for the semiconductor industry. Via this known device, a light beam generated by a laser and originally having e.g. a rectangular cross section is converted via a cylindrical lens to a line focus on the semiconductor slab to be examined. In this case, the light beam passes through the cylindrical lens with oblique light incidence. The document describes that a reflective element can also be used instead of a cylindrical lens.

However, if a reflective element is used instead of the cylindrical lens, this is usually realized by two cylindrical mirrors, of which one has a diverging effect and the other a converging effect. However, if two cylindrical mirrors are used with highly oblique incidence in this known device, the angle of incidence being approximately 60°, it is necessary to correct the resultant aberrations with an aspherical plate. Moreover, the known device can only be employed for small numerical apertures. In the case of relatively high numerical apertures, the curvatures or surface inclinations of the two cylindrical mirrors have to be up to 50°, which leads, during the application of the reflective layers during the production of the cylindrical mirrors, to great layer thickness variations which, owing to the small dimensions of the mirrors, cannot be compensated for without great effort.

The optical device for generating a line focus known from the technical book cited above likewise cannot be used in the arrangement in accordance with the abovementioned document as a replacement for the cylindrical lens without technical difficulties. For this purpose, it would be necessary to mask off at least half of the light beam cross section of the light beam, but this is accompanied by undesirable intensity losses.

The technical book cited in the introduction also describes that, via an axicon in combination with a spherical lens or via two axicons, an incident light beam having an e.g. rectangular or circular cross section transversely with respect to the light propagation direction can be converted into a light beam having a ring-shaped cross section. In order to obtain a ring-segment-shaped cross section here, parts of the ring-shaped cross section of the emergent light beam would have to be masked out, but this is in turn only possible with intensity losses.

In an arrangement—described in the technical book—for converting an incident light beam into an emergent light beam having a ring-shaped cross section, two axicons are operated in reflection, wherein the two axicons are arranged with regard to their common axis of symmetry such that light rays which impinge on the first axicon at a smaller distance from the axis of symmetry than other light rays likewise impinge on the second axicon at a smaller distance from the axis of symmetry than the other light rays. With this arrangement, even when the light beam is incident on both axicons off-axis with respect to the axis of symmetry, and when the incident light beam has a rectangular cross section, it is not possible to generate an emergent light beam having a ring-segment-shaped cross section which extends over more than an octant of a circle.

Against this background, it is an object of the present invention to develop a method for converting a light beam to a line focus in accordance with the first aspect and an optical device for converting a light beam to a line focus in accordance with the second aspect of the type mentioned in the introduction to the effect that a line focus that is as homogeneous as possible over its length is achieved, without optical components that are costly or difficult to produce being necessary for this purpose.

The invention is furthermore based on the object of developing a method for converting a light beam to a line focus of the type mentioned in the introduction in accordance with the third aspect and an optical device for converting a light beam to a line focus of the type mentioned in the introduction in accordance with the fourth aspect to the effect that, for generating the line focus, instead of one or more axicons, it is possible to use spherical and/or cylindrical optically operative surfaces that can be produced even more simply for the conversion of the light beam.

The invention is furthermore based on the object of developing an optical arrangement for converting an incident light beam into an emergent light beam of the type mentioned in the introduction in accordance with the fifth aspect to the effect that a ring-segment-shaped cross section of the emergent light beam is generated without masking out portions of the beam and without costly optical elements.

With regard to the method mentioned in the introduction for converting a light beam to a line focus of the type mentioned in the introduction in accordance with the first aspect, the object is achieved by virtue of the fact that the light beam is directed onto the at least one optically operative surface with a ring-segment-shaped cross section transversely with respect to the light propagation direction.

With regard to the optical device mentioned in the introduction for converting a light beam to a line focus in accordance with the second aspect, the object is achieved by virtue of the fact that, in the beam path of the light beam, an optical arrangement is arranged upstream of the at least one optically operative surface, which preprocesses the light beam in such a way that the light beam is incident on the at least one optically operative surface with a ring-segment-shaped cross section transversely with respect to the light propagation direction.

The method according to the invention and the optical device according to the invention for converting a light beam to a line focus differ from the method and the optical device in accordance with the technical book cited above in that a light beam that is ring-segment-shaped in cross section is applied to the at least one conical optically operative surface or the axicon. The restriction of the illumination of the at least one conical optically operative surface to a light beam that is ring-segment-shaped in cross section ensures that the numerical aperture in the narrow direction of the line focus is the same for every location on the line focus along its length.

Preferably, the ring-segment-shaped cross section of the light beam is circular-ring-segment-shaped, such that the cross section of the light beam is optimally adapted to the conical optically operative surface.

The method according to the invention and the device according to the invention thus make it possible to generate a line focus having high homogeneity along the length of the line focus.

Preferably, the light beam is directed onto the at least one optically operative surface off-axis with respect to an axis of symmetry of the surface.

In this case, it is advantageous that all beam portions of the light beam are used for generating the line focus without masking out portions of the beam, as a result of which intensity losses are avoided.

In a further preferred configuration of the method, an intensity distribution of the light in the ring-segment-shaped cross section decreases in a radial direction from the inner zone outwards, such that the intensity integrated in the circumferential direction of the ring-segment-shaped cross section is at least approximately identical for all radii.

The shorter arc length of the ring-segment-shaped cross section of the light beam on its radially inner side in comparison with the longer arc length on the radially outer side is compensated for by the abovementioned measure, that is to say by the radially inwardly increasing intensity of the light in the ring-segment-shaped cross section. The advantage of this measure is that the line focus can be generated with particularly high homogeneity along the length of the line focus.

In this case, it is furthermore preferred if the intensity distribution of the light decreases in a radial direction towards the edges, in particular decreases in a Gaussian fashion, and/or that the intensity distribution of the light in the ring-segment-shaped cross section decreases in the circumferential direction towards the edges, in particular decreases in a Gaussian fashion.

The two measures mentioned above, which can be used alternatively or cumulatively, have the consequence that diffraction effects are minimized, as a result of which the intensity distribution in the line focus is particularly homogeneous because intensity fluctuations on account of diffraction effects are avoided.

In the case of the optical device according to the invention, the at least one optically operative surface is preferably a refractive surface.

In this configuration, the at least one optically operative surface or the axicon is operated in transmission.

The light beam having a ring-segment-shaped cross section can be generated, in principle, from a light beam, e.g. a laser beam, via a suitably shaped, e.g. apodizing, diaphragm.

However, a light beam having a ring-segment-shaped cross section is preferably generated via an optical arrangement according to the invention for converting an incident light beam having a first, non-ring-segment-shaped cross section transversely with respect to the light propagation direction, e.g. a rectangular, elliptic or rotationally symmetrical cross section, into an emergent light beam having a ring-segment-shaped cross section, as will be described below.

In accordance with the third aspect of the present invention, the object with regard to the method mentioned in the introduction for converting a light beam to a line focus is achieved by virtue of the fact that the light beam is directed onto the optical arrangement with a ring-segment-shaped cross section transversely with respect to the light propagation direction outside the optical axis in such a way that a real or virtual partial-ring-shaped focus is generated outside the optical axis, and in that the light beam downstream of the optical arrangement is directed through a positive lens, which converts the real or virtual partial-ring-shaped focus to the line focus.

In accordance with the fourth aspect of the present invention, the object with regard to the optical device mentioned in the introduction for converting a light beam to a line focus is achieved by virtue of the fact that there is disposed upstream of the optical arrangement an optical preprocessing arrangement, which preprocesses the light beam in such a way that the light beam is incident on the optical arrangement with a ring-segment-shaped cross section transversely with respect to the light propagation direction outside the optical axis, and in that the optical arrangement is designed in such a way that a real or virtual partial-ring-shaped focus is generated outside the optical axis, and in that there is disposed downstream of the optical arrangement a positive lens, which is designed to convert the real or virtual partial-ring-shaped focus to the line focus.

The method in accordance with the third aspect and the optical device in accordance with the fourth aspect are based on the fundamental concept that an off-axis partial-ring-shaped focus can be converted into a line focus by a positive lens. The partial-ring-shaped focus outside the optical axis, which focus can be real or virtual, is generated by an optical arrangement which does not require a conical optically operative surface, but rather manages with spherical and/or cylindrical surfaces, which can easily be produced. As in the case of the first and second aspects, the optical arrangement is illuminated with a light beam that is ring-segment-shaped in cross section, as a result of which the numerical aperture in the narrow direction of the line focus is once again the same for every location on the line focus along its length.

Various configurations of the method in accordance with the third aspect and of the optical device in accordance with the fourth aspect are described below, via which the partial-ring-shaped focus can be generated.

In a first configuration of the method, from the light beam incident on the optical arrangement, firstly a real or virtual focus is generated on the optical axis, the focus being inverted by the optical arrangement into the partial-ring-shaped focus.

In the case of the optical device, correspondingly, the optical arrangement is designed firstly to generate from the incident light beam a real or virtual focus on the optical axis and to invert the focus into the partial-ring-shaped focus.

In the case of the method according to the invention, the inversion of the focus on the optical axis into the partial-ring-shaped focus is effected by virtue of the fact that the light beam is reflected at least once at the optical arrangement.

The optical arrangement of the optical device correspondingly has at least one reflective surface.

It is furthermore preferably the case that the light beam is totally internally reflected at least once at the optical arrangement, in order to invert the focus on the optical axis into the partial-ring-shaped focus.

The at least one reflective surface of the optical arrangement of the optical device is correspondingly furthermore preferably totally internally reflective.

In this case, the reflective surface is furthermore preferably cylindrical, independently of whether it is embodied as a mirror surface or as a totally internally reflective surface.

In order to generate the real or virtual focus on the optical axis, in accordance with a further configuration of the method, the light beam is preferably refracted at least once at the optical arrangement, and the light beam is subsequently reflected at the optical arrangement, in order to generate the real or virtual partial-ring-shaped focus outside the optical axis.

In this case, the light beam can be refracted divergently or convergently at the optical arrangement.

The optical arrangement of the optical device preferably has for this purpose, in addition to the at least one reflective surface, at least one refractive optically operative surface downstream of which the at least one reflective surface is disposed.

Preferably, the refractive surface is convergingly or divergingly refractive.

In one particularly compact configuration of the optical device, the abovementioned reflective surface and the refractive surface are present jointly on an optical component.

If the reflective surface is totally internally reflective, the abovementioned optical component can be embodied as a body which is transparent to the light beam and at the entrance side of which the refractive surface can be present and the reflective surface can be present at a lateral surface of the body extending in the light propagation direction, the reflective surface then preferably being a cylindrical surface.

It is furthermore preferably the case that the distance between the refractive surface of the optical arrangement and the positive lens is equal to the sum of the focal lengths of the refractive surface and of the positive lens.

As an alternative to the configuration of the method in accordance with the third aspect in which a real or virtual focus on the optical axis is inverted into a real or virtual partial-ring-shaped focus outside the optical axis, the partial-ring-shaped focus can also be generated, in accordance with a further configuration of the method, by virtue of the fact that the light beam is exclusively refracted at the optical arrangement.

In this case, the optical arrangement of the optical device preferably has exclusively refractive surfaces, which are furthermore preferably at least partly spherical, furthermore preferably exclusively spherical.

In this embodiment variant of the method and of the optical device, the partial-ring-shaped focus is generated outside the optical axis by sufficiently large aberrations in the purely spherically refractive optical arrangement. In this case, it is essential that the refractive surfaces are illuminated with the cross-sectionally ringsegment-shaped light beam off-axis at a sufficient distance from the optical axis, such that, on account of the aberrations or the non-linearity of the law of refraction, a partial-ring-shaped focus is generated outside the optical axis even with a small number of lenses, preferably with only one lens, of the optical arrangement. The use of menisci is particularly suitable in this embodiment variant.

In both configuration variants, that is to say both in the case of generating the partial-ring-shaped focus by inverting a focus on the optical axis by reflection and in the case of using a purely refractive design of the optical arrangement, the optical arrangement together with the positive lens preferably has a total focal length of infinity.

In accordance with the fifth aspect of the present invention, the object with regard to the optical arrangement mentioned in the introduction for converting an incident light beam into a light beam having a ring-segment-shaped cross section is achieved by virtue of the fact that the first optically operative and the second optically operative surface are arranged in the beam path of the incident light beam with respect to one another such that a first light ray of the light beam, the first light ray being incident on the first optically operative surface at a smaller distance from the axis of symmetry than a second light ray of the light beam, is incident on the second optically operative surface at a greater distance from the axis of symmetry than the second light ray.

The optical arrangement according to the invention for converting an incident light beam into an emergent light beam having a ring-segment-shaped cross section in accordance with the fifth aspect therefore differs from the optical arrangement known from the technical book by virtue of the relative arrangement of the at least two conical optically operative surfaces. While in the case of the known optical arrangement one light ray of the light beam, the light ray impinging on the first optically operative surface further outwards with respect to the axis of symmetry than another light ray, also leaves the second optically operative surface at a greater distance from the axis of symmetry, this is exactly the opposite in the case of the optical arrangement according to the invention. Through the choice according to the invention of the relative arrangement of the at least two conical optically operative surfaces, an e.g. rectangular light beam cross section can be transformed such that the emergent light beam has a ring-segment-shaped cross section.

In order to pick out the desired cross-sectionally ring-segment-shaped intensity distribution of the emergent light beam from the transformed intensity distribution, the first cross section of the incident light beam is adapted with regard to its size, and/or the impingement heights of the incident light beam on the first and the at least second optically operative surface are adapted, such that the second cross section after emergence from the at least one second optically operative surface is at least approximately circular-ring-segment-shaped.

In this case, it is advantageous that even with only two conical optically operative surfaces, a circular-ring-segment-shaped cross section of the emergent light beam is achieved, which is suitable for the illumination of the conical optically operative surface for generating a line focus.

As an alternative thereto, however, the arrangement can also be realized such that the first cross section of the incident light beam is adapted with regard to its size, and/or that the impingement heights of the incident light beam on the first and the at least one second optically operative surface are adapted, such that the second cross section after emergence from the at least one second optically operative surface is elliptic-ring-segment-shaped, and that an optical element, in particular a prism or a cylindrical telescope, is disposed downstream of the second optically operative surface in order to transform the second cross section into an at least approximately circular-ringsegment-shaped cross section.

Picking out an initially elliptic-ring-segment-shaped intensity distribution in the light beam emerging from the second optically operative surface has the advantage that the radial intensity distribution in the cross section of the emergent light beam can be met better, that is to say that a better parallelism of the transformed coordinates with respect to the desired coordinates is obtained. The further optical element transforms the elliptic-ring-segment-shaped cross section into a circular-ring-segment-shaped cross section suitable for generating a line focus via an axicon.

As in the case of the method according to the invention for generating a line focus, the incident light beam is oriented such that it is incident on the first optically operative surface and at least one second optically operative surface off-axis with respect to the axis of symmetry.

The masking out of unusable portions of the beam is thereby avoided.

A particularly good transformation behaviour of the optical arrangement in order to obtain an emergent light beam having a ring-segment-shaped cross section is achieved if the first optically operative surface and the at least one second optically operative surface are arranged on sides of the axis of symmetry which face away from one another, and if impingement heights of the incident light beam on the first optically operative surface and the second optically operative surface are at least approximately at the same distance from the axis of symmetry.

It is furthermore preferably the case that the first optically operative surface and the at least one second optically operative surface have a mutually oppositely directed conicity, which has the effect that light rays of the incident light beam which are incident on the first optically operative surface at a smaller distance from the axis of symmetry than other light rays are incident on the second optically operative surface at a greater distance from the axis of symmetry, and vice-versa.

Preferably, the angle of the conicity in the case of the at least two optically operative surfaces is identical, but it can also be different. The cone angle can in this case be 45°, but angles other than 45° are also possible for the optical arrangement according to the invention.

Furthermore, the optical arrangement can be purely refractive or purely reflective or totally internally reflective, or the first optically operative surface can be reflective or totally internally reflective and the at least one second optically operative surface can be refractive, or vice-versa.

The optical device according to the invention for converting a light beam to a line focus preferably has the optical arrangement according to the invention for converting an incident light beam into an emergent light beam having a ring-segment-shaped cross section in accordance with one or more of the configurations mentioned above.

Further features and advantages of the present invention will become apparent from the following description.

It goes without saying that the features mentioned above and those yet to be explained below can be used not only in the combination respectively indicated, but also in other combinations or by themselves, without departing from the scope of the present invention.

Exemplary embodiments of the invention are illustrated in the drawing and are described in greater detail hereinafter with reference to the drawing, in which.

Figure 20:
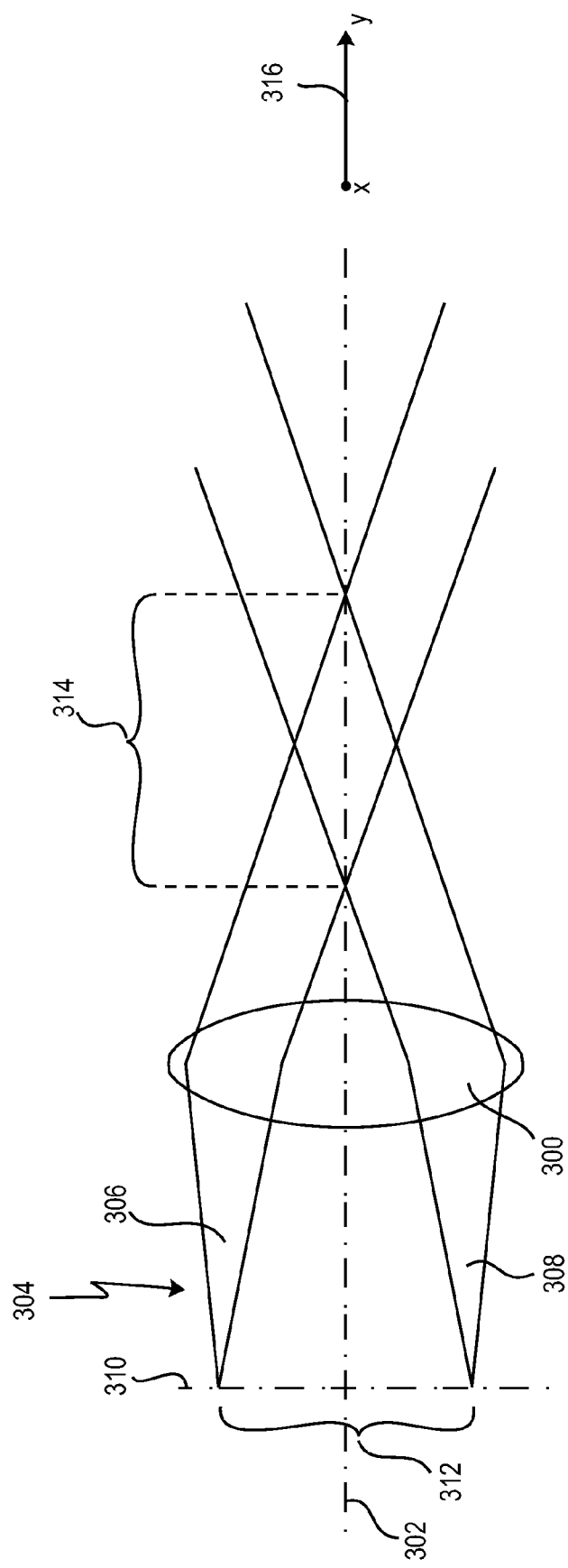
FIG. 20 shows a basic illustration of the conversion of a ring-shaped focus to a line focus via a positive lens.
Figure 21:
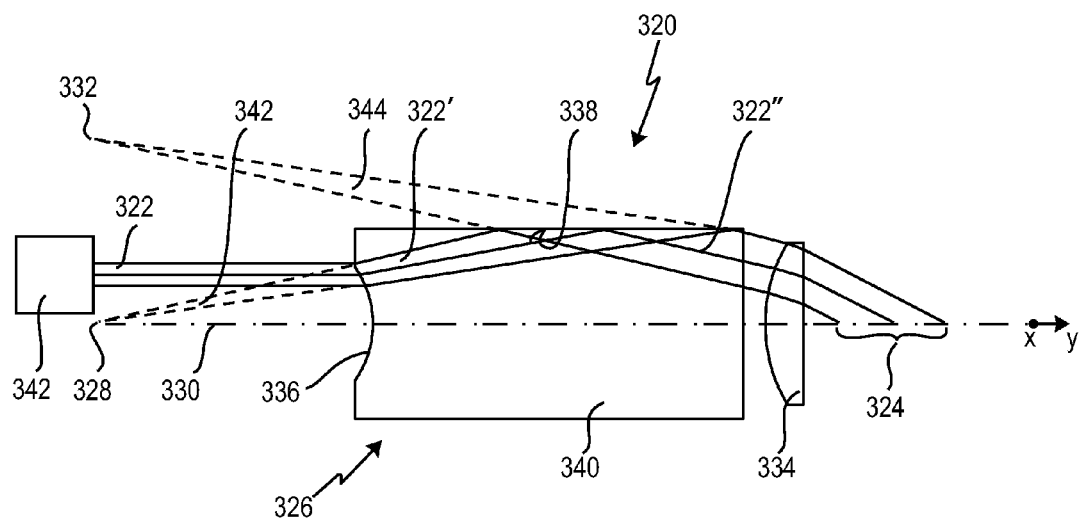
Figure 22:
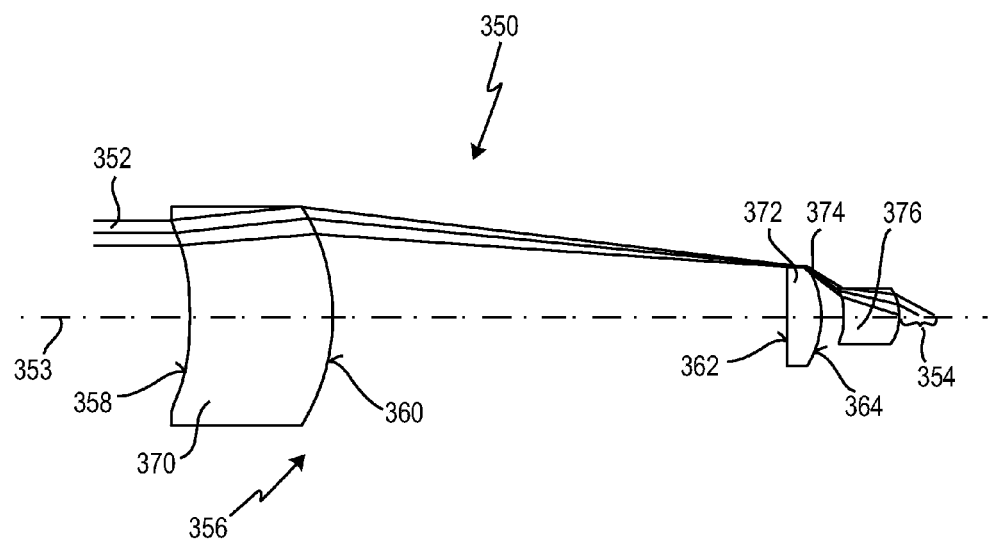

FIG. 21 shows an exemplary embodiment of an optical device for converting a light beam to a line focus in a schematic sectional illustration which is based on the fundamental principle in accordance with FIG. 20; and FIG. 22 shows a further exemplary embodiment of an optical device for converting a light beam to a line focus in a schematic sectional illustration which is based on the fundamental principle in FIG. 20.

Figure 1:
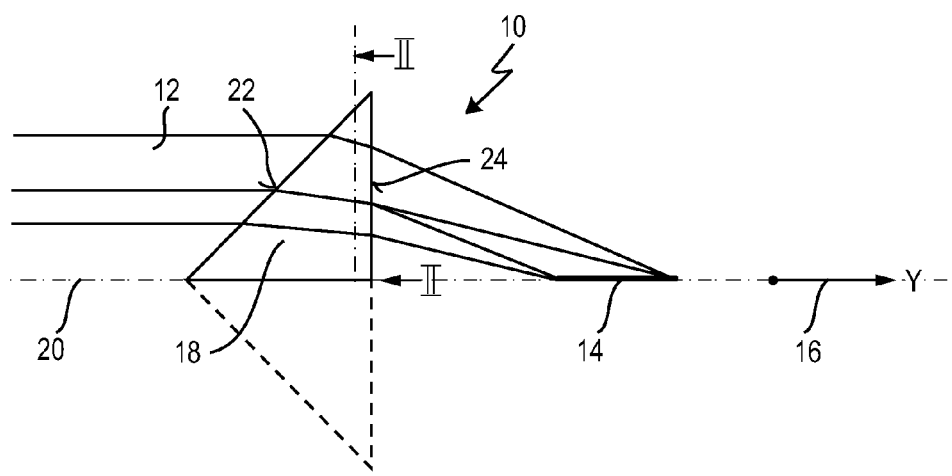
FIG. 1 shows an optical device for converting a light beam to a line focus in a schematic sectional illustration.

FIG. 1 shows an optical device—provided with the general reference sign 10, for converting a light beam 12 to a line focus 14. The line focus 14 extends according to its length along a first direction y and is narrow in a second direction x perpendicular to the first direction y. In FIG. 1, the y-axis is depicted with the reference sign 16, while the x-axis extends perpendicular to the plane of the drawing. The line focus thus lies in the xy plane.

The optical device 10 has an optical element 18, which is shown in a section in the yz plane.

The optical element 18 is an axicon, only half of which is illustrated in FIG. 1. The other half of the axicon is indicated by interrupted lines in FIG. 1. An axis of symmetry 20, corresponding to the cone axis of the axicon, runs in the y-axis.

The optical element 18 has a conical optically operative surface 22, which is embodied rotationally symmetrically around the axis of symmetry 20, wherein the surface 22 can extend completely around the axis of symmetry 20 (solid line plus interrupted line) or e.g. only over a partial circumference of less than 360°, e.g. 180°.

Since the optical element 18 is operated in transmission in the configuration in accordance with FIG. 1, the optically operative surface 22 is the light entrance surface for the light beam 12. The optically operative surface 22 is correspondingly refractive. A light exit surface 24 of the optical element 18 is planar and constitutes the base surface of the axicon.

In a method for converting the light beam 12 to the line focus 14, the light beam 12 is directed onto the conical optically operative surface 22, by which it is converted to the line focus, because the optically operative surface 22 has a focussing effect in the direction of the x-axis.

In this case, the light beam 12 is directed onto the optically operative surface 22 off-axis with respect to the axis of symmetry 20. For this reason, the optical element 18 is illustrated only as half an axicon, wherein the other half of the axicon, illustrated by interrupted lines, can be present, but is not used, or the optical element 18 is produced from the outset as half an axicon cut up along the axis of symmetry 20.

Figure 2:
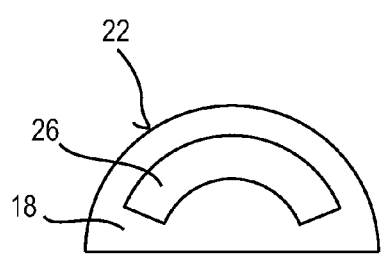
FIG. 2 shows a section through an axicon of the optical device in FIG. 1, the section being taken along the line II-II in FIG. 1.

The light beam 12 directed onto the optically operative surface 22 has, in accordance with FIG. 2, a ring-segment-shaped cross section 26 transversely with respect to the light propagation direction, the cross section being, in particular, circular-ring-segment-shaped. The cross-sectional shape of the cross section 26 of the incident light beam 12 is thus adapted to the conical contour of the optically operative surface 22.

The illumination of the optically operative surface 22 with a light beam 12 that is ring-segment-shaped in cross section ensures that the numerical aperture is the same in the x-direction for every location on the line focus 14.

Figure 3:
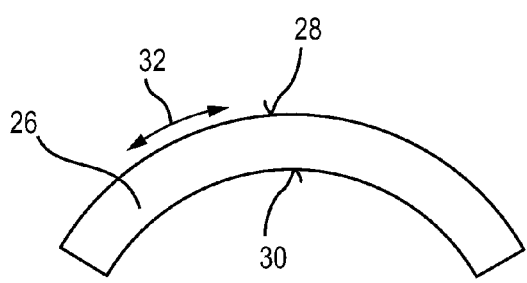
FIG. 3 shows a light beam having a ring-segment-shaped cross section in section transversely with respect to the light propagation direction.

FIG. 3 shows the cross section of the light beam 12 once again by itself. A radially outer edge of the cross section of the light beam 12 is provided with the reference sign 28 in FIG. 3, and a radially inner edge of the cross section of the light beam 12 is provided with the reference sign 30 in FIG. 3.

Since the arc length of the radially inner edge 30 is less than the arc length of the radially outer edge 28, the light beam 12 is provided such that an intensity distribution of the light in the ring-segment-shaped cross section 26 decreases in a radial direction from the inner zone outwards, that is to say from the radially inner edge 30 towards the radially outer edge 28, such that the intensity integrated in the circumferential direction (arrow 32 in FIG. 3) of the ring-segment-shaped cross section 26 is at least approximately the same for all radii between the radially inner edge 30 and the radially outer edge 28.

Figure 4:
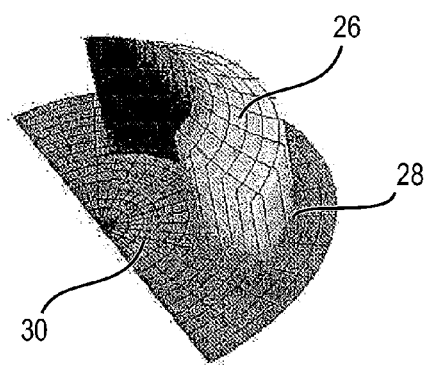
FIG. 4 shows a diagram illustrating the intensity distribution of the light in the light beam in accordance with FIG. 3.

FIG. 4 illustrates the intensity distribution of the light in the ringsegment-shaped cross section 26, the intensity distribution rising from the radially outer edge 28 to the radially inner edge 30.

Figure 5:
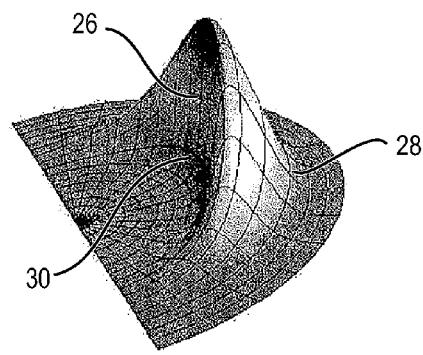
FIG. 5 shows a diagram of a further optimized intensity distribution in the ring-segment-shaped cross section of the light beam.

FIG. 5 shows, in comparison with FIG. 4, a further optimized intensity distribution in the ring-segment-shaped cross section 26 of the light beam 12, wherein the intensity distribution decreases in a radial direction towards the radially inner edge 30 and towards the radially outer edge 28, and also towards the circumferential edges in the circumferential direction. In this case, the intensity preferably decreases such that its distribution corresponds to that in FIG. 4, multiplied by a Gaussian function. Such an intensity profile in the ring-segment-shaped cross section of the light beam 12 has the advantage that diffraction effects that detrimentally affect the homogeneity of the intensity distribution in the line focus 14 are avoided as far as possible.

The incident light beam 12, in order to generate the ring-segment-shaped cross section 26, could be generated from an original light beam, e.g. a laser beam, via a suitably shaped, if appropriate apodizing, diaphragm. However, the beam shaping of the light beam 12 via a diaphragm would have the disadvantage of intensity losses, because the use of a diaphragm causes the trimming of the light beam that is originally e.g. rectangular, elliptic or circular in cross section.

Therefore, a description is given below of an optical arrangement in various embodiments which enables an incident light beam having a first, non-ringsegment-shaped cross section transversely with respect to the light propagation direction to be converted or transformed into an emergent light beam having a ring-segment-shaped cross section.

Before exemplary embodiments of an optical arrangement according to the invention are discussed, firstly a description will be given, with reference to FIGS. 6 and 7, of an optical arrangement such as is disclosed in the technical book cited in the introduction.

Figure 6:
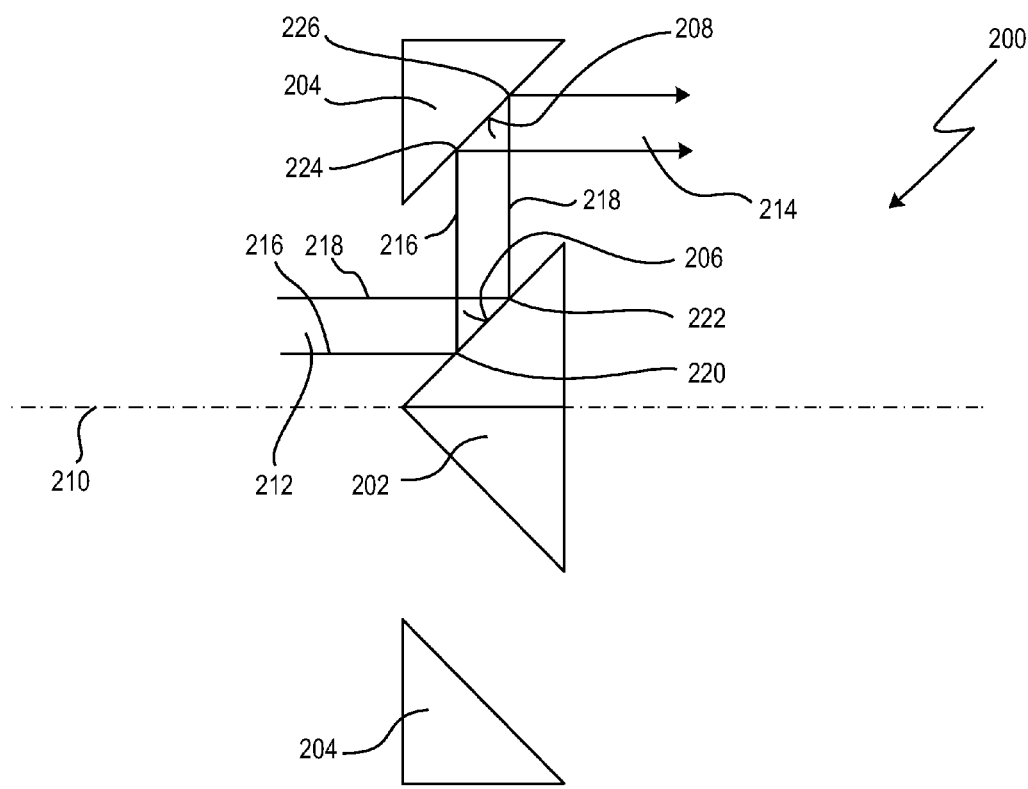
FIG. 6 shows an optical arrangement for converting an incident light beam into an emergent light beam having a ring-segment-shaped cross section, in accordance with the prior art in a sectional illustration.

The optical arrangement, provided with the reference sign 200 in FIG. 6, has a first axicon 202 and a second axicon 204. The first axicon 202 has a conical optically operative surface 206, and the second axicon 204 has a conical optically operative surface 208.

Both axicons 202 and 204 are operated in reflection here, that is to say that the conical surfaces 206 and 208 are reflective. In this case, the conical optically operative surface 206 has a diverging effect, and the conical optically operative surface 208 has a converging effect.

Both optically operative surfaces 206 and 208 define an axis of symmetry 210, which is both the cone axis of the axicon 202 and the cone axis of the axicon 204.

If the optical arrangement 200 is illuminated with a light beam centred around the axis of symmetry 210, a light beam having a ring-shaped, but non-ringsegment-shaped, cross section arises on the output side, that is to say after leaving the optically operative surface 208.

In FIG. 6, the optical arrangement 200 is not illuminated symmetrically with respect to the axis of symmetry 210, but rather with an incident light beam 212 which is directed off-axis with respect to the axis of symmetry 210 firstly onto the optically operative surface 206, from which it is reflected to the optically operative surface 208, from which a light beam 214 emerges.

In the case of the optical arrangement 200 in accordance with FIG. 6, the optically operative surface 206 and the optically operative surface 208 are arranged with respect to one another such that a light ray 216 incident on the optically operative surface 206 at a smaller distance from the axis of symmetry 210 than a second light ray 218 of the light beam 212 is likewise incident on the second optically operative surface 208 at a smaller distance from the axis of symmetry 210 than the second light ray 218.

In FIG. 6, impingement points of the light ray 216 on the optically operative surface 206 and 208 are illustrated with the reference signs 220 and 224, respectively, and impingement points of the light ray 218 on the optically operative surface 206 and 208 are illustrated with the reference signs 222 and 226, respectively.

Figure 7:
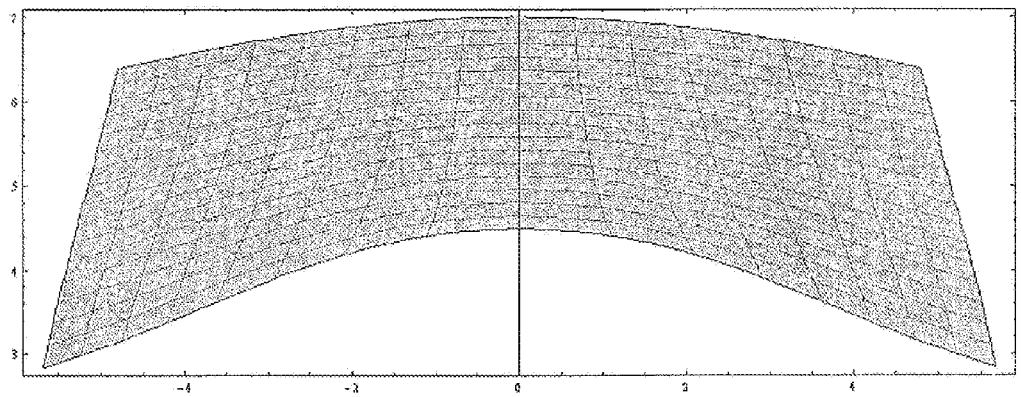
FIG. 7 shows a transformed coordinate grid illustrating the conversion of the cross section of a light beam via the optical arrangement in accordance with FIG. 6.

The off-axis illumination of the optical arrangement 200 with an incident light beam 212 having a rectangular cross section prior to impinging on the optically operative surface 206 leads to a transformation of the rectangular coordinate grid of the cross section to a coordinate grid of the cross section of the emergent light beam 214 which is illustrated in FIG. 7. In accordance with FIG. 7, the light beam 214 has a cross section which is indeed deformed relative to the originally rectangular cross section, but the grid lines depicted in the light beam cross section in FIG. 7 nevertheless show that the deformation of the light beam cross section is small at most. In particular, the arrangement in FIG. 6 cannot be used to generate a light beam 214 having a ringsegment-shaped, in particular circular-ring-segment-shaped, cross section in accordance with FIGS. 2 and 3 in which the ring segment extends over more than an octant of a circle.

With reference to FIGS. 8 to 14, a description is given below of exemplary embodiments of optical arrangements for converting an incident light beam into an emergent light beam having a ring-segment-shaped cross section, which are according to the invention.

Figure 8:
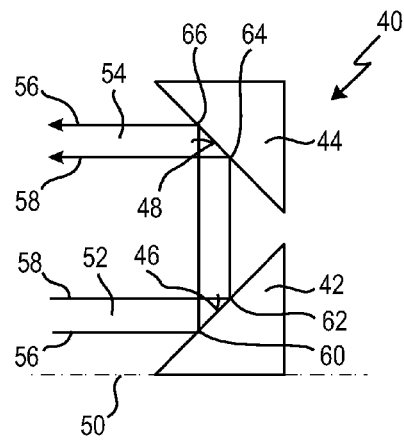
FIGS. 8 to 13 show sectional illustrations of optical arrangements for converting an incident light beam into an emergent light beam having a ring-segment-shaped cross section according to the invention.

FIG. 8 shows an optical arrangement 40, comprising a first optical element 42 and a second optical element 44. The optical elements 42 and 44 are illustrated here as half axicons, wherein the optical element 42 has a first optically operative surface 46 and the second optical element 44 has a second optically operative surface 48, wherein the optically operative surfaces 46 and 48 are conical in each case.

The two optically operative surfaces 46 and 48 together define an axis of symmetry 50, which is the cone axis of both optically operative surfaces 46 and 48. Since light is applied to the optical elements 42 and 44 only off-axis with respect to the axis of symmetry 50, the optical elements 42 and 44 are only illustrated as half axicons, but can also be embodied as full axicons, as described with reference to FIG. 1.

The optically operative surface 46 and the optically operative surface 48 are reflective, wherein the optically operative surface 46 is divergently reflective and the optically operative surface 48 is convergently reflective.

In contrast to the optical arrangement 200 in FIG. 6, the conicities of the optically operative surfaces 46 and 48 in FIG. 8 are in mutually opposite directions.

An incident light beam 52 is directed successively onto the optically operative surface 46 and onto the optically operative surface 48, from which a light beam 54 emerges. In contrast to the optical arrangement 200 in FIG. 6, a light ray 56 incident on the optically operative surface 46 at a smaller distance from the axis of symmetry 50 than a light ray 58 of the light beam 52 is incident on the optically operative surface 48 at a greater distance from the axis of symmetry 50 than the light ray 58. In FIG. 8, impingement points of the light ray 56 on the optically operative surfaces 46 and 48 are designated by the reference signs 60 and 66, and impingement points of the light ray 58 on the optically operative surfaces 46 and 48 are designated by the reference signs 62 and 64. The light rays 56 and 58 are shown here as marginal rays of the light beam 52.

Figure 9:
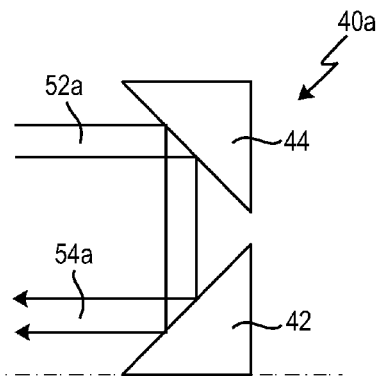

FIG. 9 shows an optical arrangement 40a comprising the same optical elements 42 and 44 as in FIG. 8, only here an incident light beam 52a is incident firstly on the optical element 44 and then on the optical element 42, from which a light beam 54a emerges.

Figure 10:
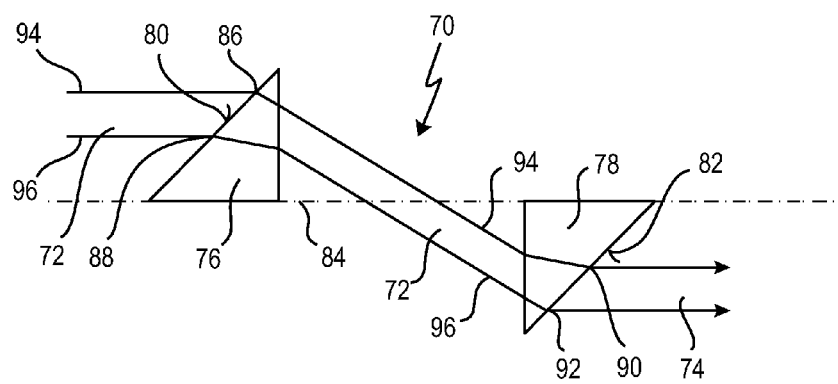

While the optical arrangements 40 and 40a in FIGS. 8 and 9 are purely reflective, FIG. 10 shows an optical arrangement 70 that is purely refractive.

The optical arrangement 70 likewise serves to convert an incident light beam 72 having a non-ring-segment-shaped cross section transversely with respect to the light propagation direction, e.g. a rectangular, circular or elliptic cross section, into an emergent light beam 74 having a ring-segment-shaped cross section.

The optical arrangement 70 has a first optical element 76 and a second optical element 78, as seen in the light propagation direction. The optical elements 76 and 78 are half axicons, of which once again only the halves used by the light beam 72 are shown.

The optical element 76 has a conical optically operative surface 80, and the optical element 78 has a conical optically operative surface 82. The optically operative surfaces 80 and 82 together define an axis of symmetry 84, which is the cone axis of the two conical surfaces 80 and 82. Both surfaces 80 and 82 are refractive and have a converging effect. As can be seen from FIG. 10, the conicity of the optically operative surfaces 80 and 82 is in mutually opposite directions.

Furthermore, the optically operative surfaces 80 and 82 are arranged on sides of the axis of symmetry 84 which face away from one another, wherein the arrangement is implemented such that impingement points or impingement heights 86, 88 of the incident light beam 72 on the optically operative surface 80 and impingement points or impingement heights 90 and 92 of the light beam 72 on the optically operative surface 82 are at least approximately at the same distance from the axis of symmetry 84. However, here as well it again holds true that a light ray 94 incident on the optically operative surface 80 at a greater radial distance from the axis of symmetry 84 than a light ray 96 of the incident light beam 72 is incident on the optically operative surface 82 at a smaller radial distance from the axis of symmetry 84 than the light ray 96, and vice-versa.

Figure 11:
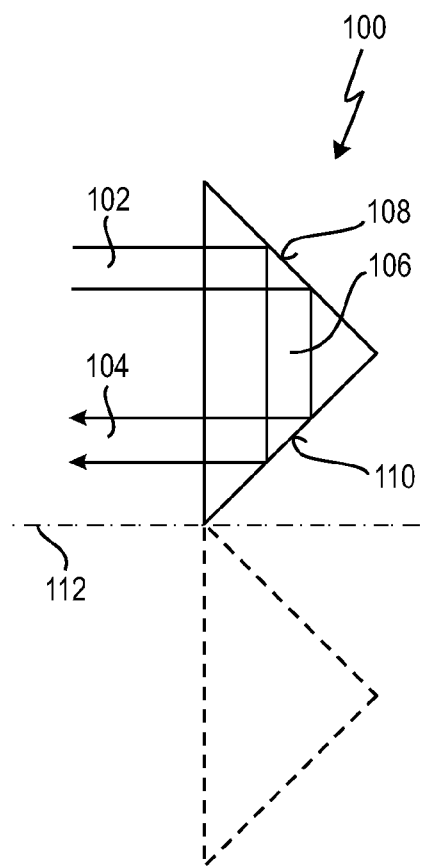

FIG. 11 shows a further optical arrangement for converting an incident light beam 102 having a non-ring-segment-shaped cross section transversely with respect to the light propagation direction into an emergent light beam 104 having a ringsegment-shaped cross section. The optical arrangement 100 differs from the previous optical arrangements in that it is operated in total internal reflection.

The optical arrangement 100 has an optical element 106, which constitutes the combination of two axicons or two half axicons in one component, to be precise the optical element 106 has a first conical optically operative surface 108 and a second conical optically operative surface 110. Both surfaces 108, 110 together define an axis of symmetry 112, which is the cone axis of both conical surfaces 108 and 110. In this case, the optically operative surface 108 has a converging effect, and the second optically operative surface 110 has a diverging effect. Both optically operative surfaces 108, 110 are totally internally reflective.

In order to facilitate understanding of the conicity and rotational symmetry of the optically operative surfaces 108 and 110 about the axis of symmetry 112, FIG. 11 shows the completion of the optical element 106 using interrupted lines, the part which lies below the axis of symmetry 112 not being used by the light beam 102 owing to the off-axis illumination of the optical element 106.

For the rest, the optical arrangement 100 is comparable to the optical arrangement 40*a* in FIG. 9, such that reference can be made to the description in respect thereof.

Figure 12:
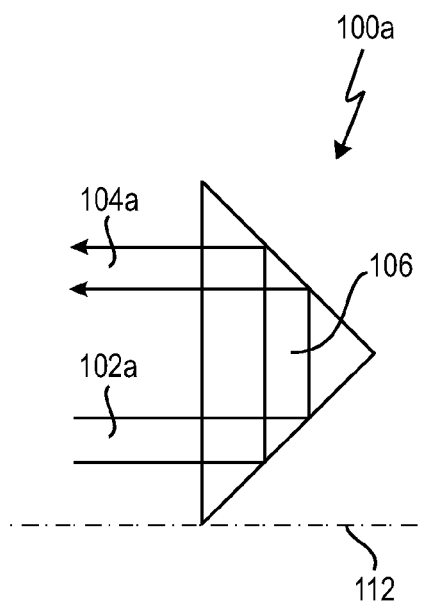

FIG. 12 shows a modification of the optical arrangement 100 in the form of an optical arrangement 100*a*, which has the same optical element 106 as in FIG. 11, but in which the incident light beam 102*a* and the emergent light beam 104*a* are interchanged. The arrangement 100*a* therefore substantially corresponds to the optical arrangement 40 in FIG. 8.

Figure 13:
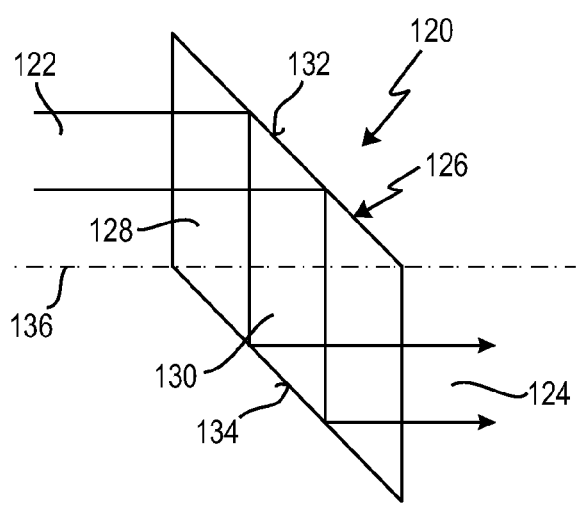
Figure 14:
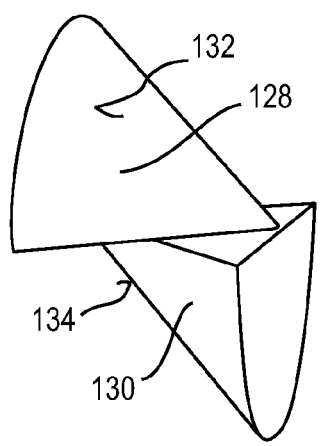
FIG. 14 shows a perspective illustration of the optical arrangement in FIG. 13 with omission of the light beam.

FIGS. 13 and 14 show a further optical arrangement 120 for converting an incident light beam 122 into an emergent light beam 124 having a ring-segment-shaped cross section, which is operated in total internal reflection like the optical arrangements 100 and 100*a* in FIGS. 11 and 12, respectively.

The optical arrangement 120 here has an optical element 126 formed from two half axicons 128 and 130, the two half axicons 128, 130 being shown in perspective view in FIG. 14.

The optical element 126 has a first conical optically operative surface 132 and a second conical optically operative surface 134, both of which are totally internally reflective.

As in the case of the optical arrangement 70 in accordance with FIG. 10, the beam path of the incident light beam 122 and the beam path of the emergent light beam 124 run symmetrically with respect to the axis of symmetry 136, which is defined by the optically operative surfaces 132 and 134 and is the cone axis of both conical surfaces 132, 134.

While the exemplary embodiments mentioned above are of purely reflective, purely refractive or purely totally internally reflective type, combinations of these types are, however, also possible.

Furthermore, the cone angles of the optically operative surfaces are illustrated as 45° in the previous exemplary embodiments, but the cone angles can also be different from 45°.

The embodiments of the optical arrangements 70 and 120 are particularly preferred owing to their symmetry in relation to the respective axis of symmetry with regard to their transformation behaviour, e.g. in order to transform a light beam having a rectangular input cross section into a light beam having a ring-segment-shaped output cross section.

Figure 15:
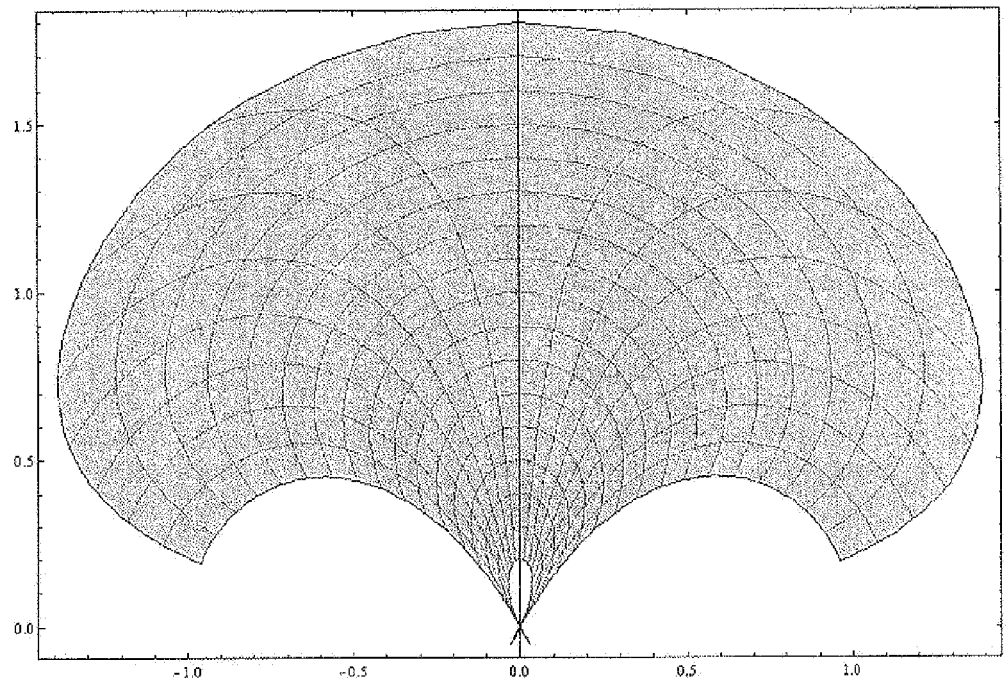
FIG. 15 shows a transformed coordinate grid illustrating the conversion of the cross section of a light beam via one of the optical arrangements in accordance with FIGS. 8 to 14.

FIG. 15 shows the resulting transformation of a light beam having a rectangular input cross section, such as is obtained e.g. via the optical arrangement 70. A comparison of the grid lines depicted in FIG. 15, which show the transformation of the originally rectangular coordinates, verifies that a significantly more pronounced transformation of the originally rectangular coordinates into curved coordinates is obtained with the optical arrangements according to the invention.

Figure 16:
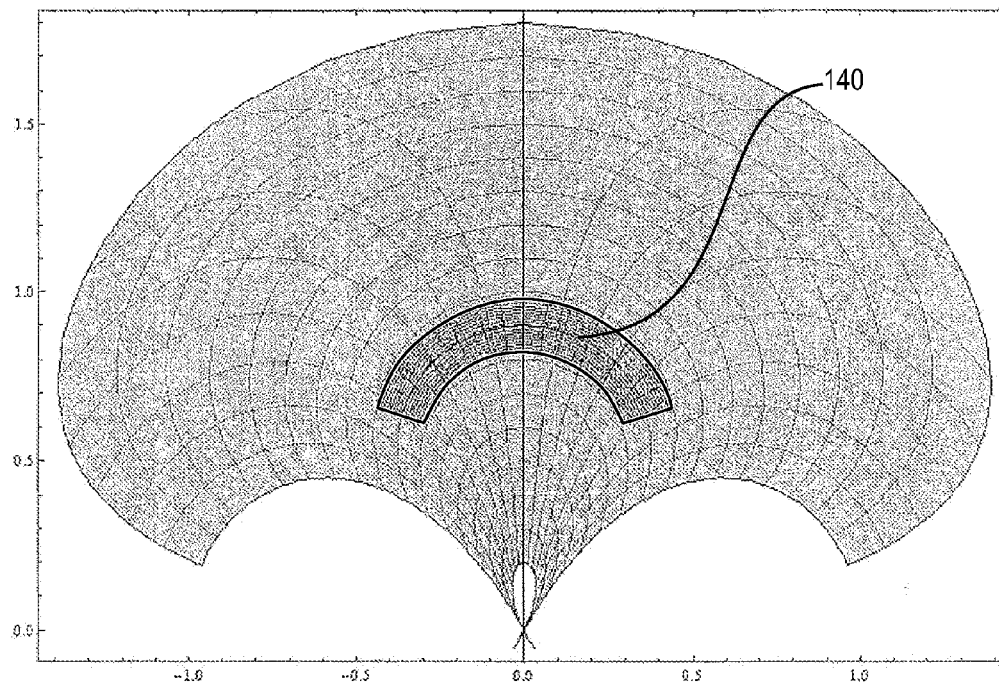
FIG. 16 shows the coordinate grid in FIG. 15, a ring-segment-shaped cross section of the light beam that is to be picked out additionally being depicted, the cross section being circular-ring-segment-shaped.

FIG. 15 shows the cross section of the light beam 74 emerging from the optical arrangement 70, for example, but this is not yet ring-segment-shaped. By adapting the cross section of the incident light beam 72 with regard to its size and/or with regard to the impingement heights of the incident light beam 72 on the first and the second optically operative surface 80 and 82, respectively, the cross section of the emergent light beam 74 can now be made ring-segment-shaped. In this case, the abovementioned adaptation of the incident light beam 72 to the optically operative surfaces 80 and 82 can be carried out such that the emergent light beam 74 directly after emerging from the second optically operative surface 82 is at least approximately circular-ring-segment-shaped. FIG. 16 depicts such a circular-ring-segment-shaped cross section 140, which corresponds to the circular-ring-segment-shaped cross section 26 in FIG. 2. As is evident from FIG. 16, however, the grid lines of the coordinate transformation are not exactly parallel to the cross section 140, depicted as ideally circular-ring-segment-shaped, at the radial edges thereof.

Figure 17:
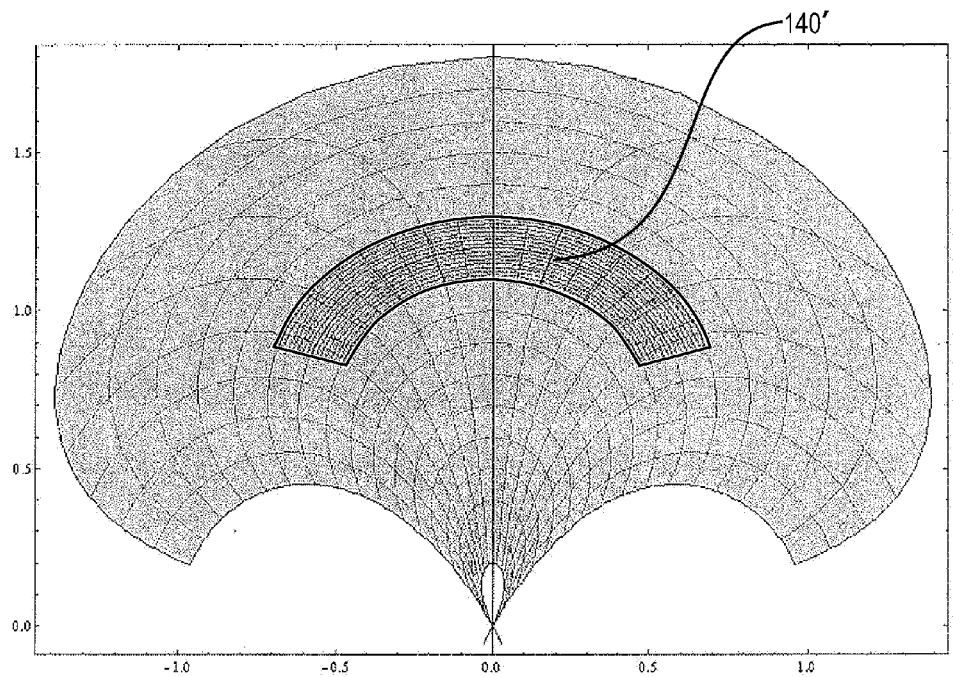
FIG. 17 shows the coordinate grid in FIG. 15, in contrast to FIG. 16 an emergent light beam having an elliptic-ring-segment-shaped cross section being picked out.

In order to obtain a better parallelism here, and thus to meet the radial energy distribution in the cross section of the emergent light beam (e.g. light beam 74 in FIG. 10) better, the cross section of the incident light beam (e.g. of the light beam 72 in FIG. 10) can also be adapted with regard to its size and/or with regard to its impingement heights on the optically operative surfaces (e.g. optically operative surfaces 80 and 82 in FIG. 10) such that the emergent light beam (e.g. the light beam 74 in FIG. 10) after emerging from the second optically operative surface (e.g. optically operative surface 82 in FIG. 10) is elliptic-ring-segment-shaped in cross section 140', as is illustrated in FIG. 17. FIG. 17 shows that such an elliptic-ring segment can be picked out very precisely from the transformed field.

Via a suitable optical unit, in particular a prism (see FIG. 19) or a cylindrical telescope, the emergent light beam can then be postprocessed in order to obtain a circular-ring-segment-shaped cross section 26 in FIG. 2, which is optimal for the optical device 10 in FIG. 1 for generating the line focus 14.

Figure 18:
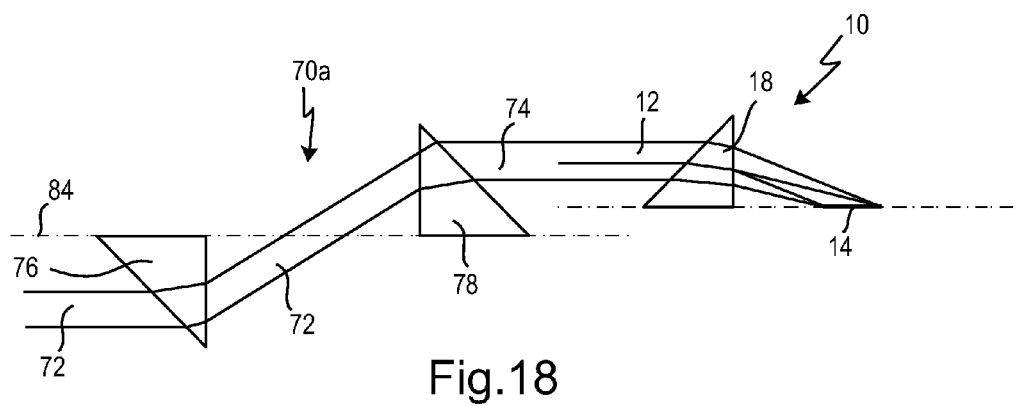
FIG. 18 shows, in a schematic sectional illustration, the optical device in accordance with FIG. 1, extended by the optical arrangement in FIG. 10.

FIG. 18 shows the device 10 for generating the line focus 14 in combination with the optical arrangement 70, wherein in FIG. 18, in comparison with FIG. 10, the optical element 76 is arranged below the axis of symmetry 84 and the optical element 78 is arranged above the axis of symmetry 84 and the beam path of the incident light beam 72 is correspondingly inverted with respect to the axis of symmetry 84. In this configuration, the device 10 for generating the line focus 14 has a total of three axicons 76, 78 and 80. In this case, the light beam 12 incident in the optical element 18 is the light beam 74 emerging from the second optical element 78 and has a circular-ringsegment-shaped cross section.

Figure 19:
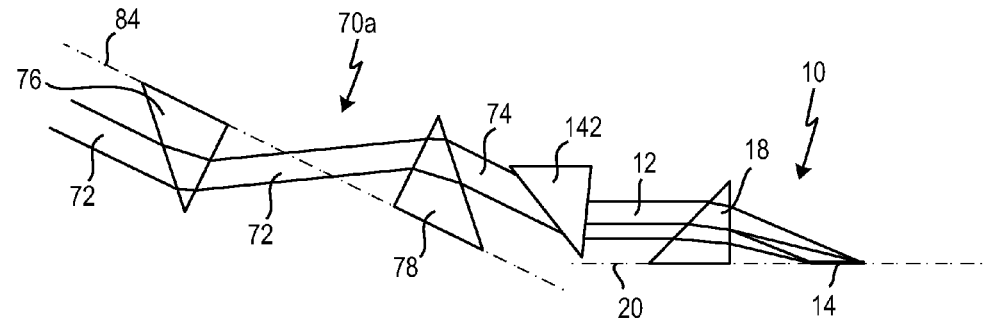
FIG. 19 shows a modification of the optical device in FIG. 18, in which the entire light beam path is arranged above the plane of the line focus.

FIG. 19 shows a modification of the device 10 in FIG. 18 in combination with an optical arrangement 70*a* which is modified relative to the optical arrangement 70 and which is implemented such that all the optical elements are arranged above the plane of the line focus 14.

Furthermore, in FIG. 19, a further optical element 142, which here is a prism, is provided between the second optical element 78 of the optical arrangement 70*a* and the optical element 18 of the device 10. The optical element 142 firstly serves for deflecting the emergent light beam 74 in its propagation direction, such that the resultant incident light beam 12, as in FIG. 1, is incident in the optical element 18 approximately parallel to the axis of symmetry 20. Secondly, this arrangement makes it possible, as described above with reference to FIG. 17, to adapt the incident light beam 72 to the optical elements 76 and 78 such that the emergent light beam 74 has an elliptic-ringsegment-shaped cross section, and the optical element 142 converts the elliptic-ringsegment-shaped cross section into a circular-ring-segment-shaped cross section, such that the light beam 12 incident in the optical element 18 has a circular-ring-segment-shaped cross section in accordance with FIG. 2.

While a description has been given above of optical devices and methods for converting a light beam to a line focus which make use of at least one axicon illuminated in ring-segment-shaped fashion, a description is given below of optical devices and methods for converting a light beam to a line focus which do not have conical optically operative surfaces, but rather use cylindrical and/or spherical optically operative surfaces.

FIG. 20 illustrates the basic principle of this aspect.

FIG. 20 shows a positive lens 300, which defines an optical axis 302.

A light beam 304, two partial beams 306 and 308 of which are shown in FIG. 20, emerges from a focal plane 310, in which the light beam 304 has the form of a ring focus 312. The light beam 304 is directed through the positive lens 300 and imaged onto a line focus 314 or converted to the line focus 314. Like the line focus 14 in FIG. 1, the line focus 314 has a length along a direction y, as is illustrated with a coordinate axis 316 in FIG. 20, and the line focus 314 is narrow or focussed in a direction x perpendicular thereto.

The positive lens 300 converts the ring focus 312 to the line focus 314.

The light beam 304 emerging from the ring focus 312 need not necessarily run parallel to the optical axis 302, but rather can also be inclined relative thereto, as is illustrated in FIG. 20.

As a result of the imaging of the ring focus 312 via the positive lens 300, it is thus possible to use a "simple" lens to generate a conical wavefront and thus the line focus 314 in the manner as can be generated e.g. via the above-described device 10, which, however, requires at least one conical optically operative surface or an axicon for this purpose.

In principle, the ring focus 312 can be generated by an optical arrangement which constitutes a combination of an axicon with a positive lens, as described in the technical book cited in the introduction. However, a description is given below of how the ring focus 312 can be generated without the aid of axicons.

Since the line focus generated is intended to be used for treating a substrate, in particular for melting a silicon layer, here only the area of the ring focus 312 above the optical axis 302 in FIG. 20 is of interest, i.e. the following considerations are based on a partial-ring-shaped focus, which is e.g. only a half-ring or an even smaller part of a full ring.

FIG. 21 shows an optical device 312 for converting a light beam 322 to a line focus 324, corresponding to the line focus 14 as generated by the optical device 10 in accordance with FIG. 1.

The line focus 324 correspondingly has, in a first direction y, a length that is greater by a multiple than the extent of the line focus 324 in the direction x perpendicular to the direction y. The direction x extends perpendicular to the plane of the drawing in FIG. 21.

The optical device 320 has an optical arrangement 326, which generates from the light beam 322 firstly a focus 328 on the optical axis 330, the focus being virtual, and the optical arrangement 326 then inverts the focus 328 on the optical axis 330 into a partial-ring-shaped focus 332 outside the optical axis 330. From the partial-ring-shaped focus 332, only the vertex of the partial ring is shown in FIG. 21.

The partial-ring-shaped focus 332, which is likewise virtual, is then converted to the line focus 324 via a positive lens 334 disposed downstream of the optical arrangement 326.

In order to generate the focus 328 on the optical axis 330 from the light beam 322, the optical arrangement 326 has a refractive surface 336, which, as seen in the light propagation direction, is concave and thus divergently refractive. The refractive surface 336 is a spherical surface.

In order to invert the focus 328 on the optical axis 330 into the partialring-shaped focus 332 outside the optical axis 330, the optical arrangement 326 has, disposed downstream of the refractive surface 336, a reflective surface 338. In the exemplary embodiment shown, the reflective surface 338 is a totally internally reflective surface, that is to say that it constitutes a transition from an optically denser medium to an optically less dense medium.

The reflective surface 338 is embodied as a lateral surface of a cylinder or as a partial lateral surface of a cylinder.

In the exemplary embodiment shown, the refractive surface 336 and the reflective surface 338 are formed on an integral optical component 340, which is transparent to the wavelength(s) of the light beam 322. In this case, the refractive surface 336 forms the entrance side of the optical component 340, and the reflective surface 338 extends in the light propagation direction along a lateral surface of the optical component 340. The positive lens 334 can likewise be integrated into the component 340.

The optical device 320 additionally has an optical preprocessing arrangement 342, which preprocesses the light beam 322 such that it is incident in the optical arrangement 326 with a ring-segment-shaped cross section, as is shown in FIG. 3.

The method for converting the light beam 322 to the line focus 324, this method being carried out by the optical device 320, is described below.

The light beam 322 having a ring-segment-shaped cross section is collimated and directed onto the optical arrangement 326 outside the optical axis 330. At the refractive surface 336, the light beam 322 is refracted away from the optical axis 330.

The backward extension of the refracted light beam 322' then produces the virtual focus 328 on the optical axis 330, as is indicated by interrupted lines 342.

From the refractive surface 336, the light beam 322' is directed onto the reflective surface 338, at which the light beam 322' is then totally internally reflected. The backward extension of the totally internally reflected light beam 322" is illustrated in FIG. 21 by interrupted lines 344 that intersect at the partial-ring-shaped focus 332 outside the optical axis 330.

The reflected light beam 322" is then directed through the positive lens 334. In this case, the positive lens 334 converts the virtual partial-ring-shaped focus 332 to the line focus 324.

Modifications of the optical device 320 are also possible. Thus, for generating the focus 328 on the optical axis 330, a convergingly effective refractive surface can also be used instead of a divergingly effective refractive surface 336.

Instead of the total internal reflection of the light beam 322' at the reflective surface 338, it is also possible to use a mirror surface.

Moreover, the reflective surface 338 can also be embodied in spherical fashion instead of in cylindrical fashion. Finally, the refractive surface 336 and the reflective surface 338 can also be distributed between individual optical components.

The distance between the refractive surface 336 and the positive lens 334 is chosen such that it is equal to the sum of the focal lengths of the refractive surface 336 and of the positive lens 334.

The total focal length of the optical arrangement 326 including the converging lens 334 is infinity.

The positive lens 334 is spherical. Overall, therefore, proceeding from the refractive surface 336, this results in a combination of optically operative surfaces in the following sequence: spherical—cylindrical—spherical. In order to generate the line focus 324, therefore, no conical optically operative surface is required.

FIG. 22 shows a further exemplary embodiment of an optical device 350 for converting a light beam 352 to a line focus 354. The optical device 350 has an optical arrangement 356 having exclusively refractive surfaces 358, 360, 362 and 364.

All the abovementioned refractive surfaces 358-364 are spherical in this case.

The light beam 352 is once again directed with a ring-segment-shaped cross section and in collimated fashion through the optical arrangement 356, wherein the light beam 352 is applied to the lenses 370 and 372 formed by the refractive surfaces 358 and 360, and 362 and 364, far off-axis. After passage through the lenses 370 and 372, a partial-ring-shaped focus 374 is generated from the light beam 352 on the exit side by the refractive surface 364, the focus being converted to the line focus 354 by the positive lens 376 following the optical arrangement 356.

In the case of the optical device 350, the generation of the partial-ring-shaped focus 374 is based substantially on aberrations or the non-linearity of the law of refraction in the non-paraxial region, i.e. the light beam 352 is directed through the lenses 370 and 372 far off-axis from the optical axis 353.

The invention claimed is:

1. An optical arrangement, comprising:
    a first optical element having a first optically operative surface having a top with a first top circumference, a circular bottom with a first bottom circumference which is greater than the first top circumference, and sides extending from the first top circumference to the first bottom circumference; and
    a second optical element having a second optically operative surface having a top with a second top circumference, a circular bottom with a second bottom circumference which is greater than the second top circumference, and sides extending from the second top circumference to the second bottom circumference,
    wherein:
        the first and second optically operative surfaces define an axis of symmetry; and
        during use of the arrangement:
            a light beam is incident successively on the first optically operative surface and the second optically operative surface;
            the light beam is incident on the first and second optically operative surfaces off-axis with respect to the axis of symmetry such that the light beam is not incident at an intersection of the axis of symmetry with the first optically operative surface and such that the light beam is not incident at an intersection of the axis of symmetry with the second optically operative surface;
            a first light ray of the light beam is incident on the first optically operative surface at a first distance from the axis of symmetry;
            the first light ray of the light beam is incident on the second optically operative surface at a second distance from the axis of symmetry;
            the first distance is less than the second distance; and
            when the light beam has a non-ring-segment-shaped cross section which is transverse with respect to a propagation direction of the light beam when incident on the first optically operative surface, the light beam has a ring-segment-shaped cross section which is transverse with respect to a light propagation direction of the light beam when it emerges from the second optical element, the ring-segment-shaped cross section being an incomplete ring.

2. The optical arrangement of claim 1, wherein the non-ring-segment-shaped cross section is sized so that the ring-segment-shaped cross section is at least approximately circular-ring-segment-shaped.

3. The optical arrangement of claim 1, wherein, during use of the optical arrangement, impingement heights of the light beam incident on the first and second optically operative surfaces are such that the ring-segment-shaped cross section is at least approximately circular-ring-segment-shaped.

4. The optical arrangement of claim 1, further comprising a third optical element downstream of the second optical element along a path of the light beam through the optical arrangement so that, during use of the optical arrangement, the third optical element transforms the ring-segment-shaped cross section of the light beam into an at least approximately circular-ring-segment-shaped cross section.

5. The optical arrangement of claim 1, further comprising a third optical element downstream of the second optical element along a path of the light beam through the optical arrangement, wherein, during use of the optical arrangement, the ring-segment-shaped cross section is elliptic-ring-segment-shaped, and the third optical element transforms the elliptic-ring-segment-shaped cross section into an at least approximately circular-ring-segment-shaped cross section.

6. The optical arrangement of claim 1, wherein the first optically operative surface and the second optically operative surface are arranged on sides of the axis of symmetry which face away from one another, and, during use of the optical arrangement, impingement heights of the light beam incident on the first optically operative surface and impingement height of the light beam incident on the second optically operative surface are at least approximately at the same distance from the axis of symmetry.

7. The optical arrangement of claim 1, wherein the first optically operative surface and the second optically operative surface have a mutually oppositely directed conicity.

8. The optical arrangement of claim 1, wherein the first optically operative surface is reflective.

9. The optical arrangement of claim 1, wherein the first optically operative surface is totally internally reflective.

10. The optical arrangement of claim 1, wherein the second optically operative surface is reflective.

11. The optical arrangement of claim 1, wherein the second optically operative surface is totally internally reflective.

12. The optical arrangement of claim 1, wherein the first optically operative surface is refractive.

13. The optical arrangement of claim 12, wherein the second optically operative surface is refractive.

14. A method, comprising:
    directing a light beam having a ring-segment-shaped cross section transverse to a propagation of the light beam onto an optically operative surface to convert the light beam so that the light beam has a line focus which extends along a first direction and a second direction perpendicular to the first direction, a length of the line focus along the first direction being less than a length of the line focus along the second direction, wherein:
the optically operative surface has a top with a top circumference, a circular bottom with a bottom circumference which is greater than the top circumference, and sides extending from the top circumference to the bottom circumference; and
the ring-segment-shaped cross section is an incomplete ring.

15. The method of claim 14, comprising directing the light beam onto the optically operative surface off-axis with respect to an axis of symmetry of the optically operative surface such that the light beam is not incident at an intersection of the axis of symmetry with the optically operative surface.

16. The method of claim 14, wherein an intensity distribution of the light in the ring-segment-shaped cross section decreases in a radial direction towards the edges so that an intensity integrated in a circumferential direction of the ring-segment-shaped cross section is at least approximately identical for all radii.

17. A system, comprising:
an optical arrangement configured to process a light beam so that, during use of the system, the light beam has a ring-segment-shaped cross section transverse to a light propagation direction of the light beam; and
an optical element downstream of the optical arrangement along a path of the light through the system, the optical element having an optically operative surface so that, during use of the optical element, the light beam having the ring-segment-shaped cross section transverse to a propagation of the light beam is directed onto the optically operative surface to convert the light beam so that the light beam has a line focus which extends along a first direction and a second direction perpendicular to the first direction, a length of the line focus along the first direction being less than a length of the line focus along the second direction,
wherein:
the optically operative surface has a top with a top circumference, a circular bottom with a bottom circumference which is greater than the top circumference, and sides extending from the top circumference to the bottom circumference; and
the ring-segment-shaped cross section is an incomplete ring.

18. The optical device of claim 17, wherein the optically operative surface is a refractive surface.

19. A method, comprising:
directing a light beam onto an optical arrangement, the light beam having a ring-segment-shaped cross section transverse to a propagation direction of the light outside an optical axis which is defined by the optical arrangement before impinging on the optical arrangement, the light beam having a real or virtual partial-ring-shaped focus outside the optical axis after interacting with the optical arrangement; and
subsequently directing the light beam through a positive lens to convert the real or virtual partial-ring-shaped focus to a line focus which extends along a first direction and a second direction perpendicular to the first direction, a length of the line focus along the first direction being less than a length of the line focus along the second direction,
wherein the ring-segment-shaped cross section is an incomplete ring.

20. A system, comprising:
an optical arrangement; and
a positive lens,
wherein, during use of the system:
a light beam is directed onto the optical arrangement, the light beam having a ring-segment-shaped cross section transverse to a propagation direction of the light outside an optical axis which is defined by the optical arrangement before impinging on the optical arrangement, the light beam having a real or virtual partial-ring-shaped focus outside the optical axis after interacting with the optical arrangement; and
subsequently the light beam is directed through a positive lens to convert the real or virtual partial-ring-shaped focus to a line focus which extends along a first direction and a second direction perpendicular to the first direction, a length of the line focus along the first direction being less than a length of the line focus along the second direction,
wherein the ring-segment-shaped cross section is an incomplete ring.

* * * * *

UNITED STATES PATENT AND TRADEMARK OFFICE
CERTIFICATE OF CORRECTION

| | | |
|---|---|---|
| PATENT NO. | : 9,042,032 B2 | |
| APPLICATION NO. | : 14/074207 | |
| DATED | : May 26, 2015 | |
| INVENTOR(S) | : Muenz | |

It is certified that error appears in the above-identified patent and that said Letters Patent is hereby corrected as shown below:

In the specification

Col. 6, line 39, delete "ringsegment-shaped" and insert -- ring-segment-shaped --.

Col. 7, line 43, delete "circular-ringsegment-shaped" and insert -- circular-ring-segment-shaped --.

Col. 10, line 25, delete "ringsegment-shaped" and insert -- ring-segment-shaped --.

Col. 10, line 51, delete "non-ringsegment-shaped" and insert -- non-ring-segment-shaped --.

Col. 11, line 8, delete "non-ringsegment-shaped," and insert -- non-ring-segment-shaped, --.

Col. 11, line 45, delete "ringsegment-shaped," and insert -- ring-segment-shaped, --.

Col. 13, line 2, delete "ringsegment-shaped" and insert -- ring-segment-shaped --.

Col. 14, lines 52-53, delete "circular-ringsegment-shaped" and insert -- circular-ring-segment-shaped --.

Col. 15, line 3, delete "elliptic-ringsegment-shaped" and insert -- elliptic-ring-segment-shaped --.

Col. 15, line 4, delete "elliptic-ringsegment-shaped" and insert -- elliptic-ring-segment-shaped --.

Col. 16, line 10, delete "partialring-shaped" and insert -- partial-ring-shaped --.

In the claims

Col. 20, line 3, Claim 18, delete "optical device" and insert -- system --.

Signed and Sealed this
Ninth Day of February, 2016

Michelle K. Lee
*Director of the United States Patent and Trademark Office*